US011809714B2

(12) United States Patent
Bert

(10) Patent No.: US 11,809,714 B2
(45) Date of Patent: Nov. 7, 2023

(54) EFFECTIVE STORAGE ALLOCATION FOR SEQUENTIALLY-WRITTEN MEMORY DEVICES

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/187,497

(22) Filed: Feb. 26, 2021

(65) Prior Publication Data

US 2022/0276789 A1    Sep. 1, 2022

(51) Int. Cl.
G06F 3/06       (2006.01)
G06F 12/02      (2006.01)

(52) U.S. Cl.
CPC .......... *G06F 3/0613* (2013.01); *G06F 3/0631* (2013.01); *G06F 3/0652* (2013.01); *G06F 3/0683* (2013.01); *G06F 12/0246* (2013.01); G06F 2212/7201 (2013.01)

(58) Field of Classification Search
CPC .... G06F 3/0613; G06F 3/0631; G06F 3/0652; G06F 3/0683; G06F 12/0246; G06F 2212/7201
See application file for complete search history.

(56) References Cited

U.S. PATENT DOCUMENTS

| | | | | |
|---|---|---|---|---|
| 9,588,694 B1* | 3/2017 | Anand | ................ | G06F 16/1727 |
| 9,836,232 B1* | 12/2017 | Vasquez | .............. | G06F 12/0804 |
| 10,242,012 B1* | 3/2019 | Basov | ................... | G06F 16/128 |
| 2010/0174846 A1* | 7/2010 | Paley | .................. | G06F 12/0866 |
| | | | | 711/E12.001 |
| 2013/0173842 A1* | 7/2013 | Ng | ...................... | G06F 12/0246 |
| | | | | 711/E12.008 |
| 2014/0149476 A1* | 5/2014 | Kishimoto | .......... | G06F 11/1451 |
| | | | | 707/827 |
| 2016/0342509 A1* | 11/2016 | Kotte | .................. | G06F 12/0638 |
| 2017/0153842 A1* | 6/2017 | Iwabuchi | .............. | G06F 3/0643 |
| 2017/0192688 A1* | 7/2017 | Dhuse | ................. | G06F 16/2246 |
| 2019/0303293 A1* | 10/2019 | Byun | ................. | G06F 12/0607 |
| 2020/0167274 A1 | 5/2020 | Bahirat et al. | | |
| 2020/0349121 A1 | 11/2020 | Lee et al. | | |
| 2021/0223994 A1* | 7/2021 | Kanno | ................. | G06F 3/0656 |

OTHER PUBLICATIONS

Extended European Search Report for Application No. 22158999.7, dated Jul. 25, 2022, 8 pages.

\* cited by examiner

*Primary Examiner* — Tasnima Matin
(74) *Attorney, Agent, or Firm* — Lowenstein Sandler LLP

(57) ABSTRACT

An input/output (I/O) write request directed at a plurality of memory devices having memory cells is received by a processing device. The write request includes a set of data. The processing device appends the set of data to a compound data object. The compound data object comprises one or more sequentially written data objects. The processing device associates the compound data object with one or more groups of memory cells of the plurality of memory devices. The processing device causes the compound data object to be written to the one or more groups of memory cells of the plurality of memory devices.

20 Claims, 9 Drawing Sheets

| Zone Starting LBA 260 | Block Set Identifier 262 | Cursor Value 264 | ... | State 266 | DS Identifier 268 | Counter 270 | ... |

Zone Mapping Data Structure 158

```
Receive an input/output (I/O) erase request directed at a plurality of
memory devices, wherein the I/O erase request comprises a set of data.
610
```

↓

```
Identify a group of memory cells of the plurality of memory devices
associated with the set of data.    620
```

↓

```
Mark the set of data for erasure.    630
```

↓

```
Decrement a counter associated with the group of memory cells of the
plurality of memory devices, wherein the counter represents a number of
sets of data associated with the group of memory cells.    640
```

↓

```
Identify an empty group of memory cells, wherein the counter associated
with the empty group of memory cells satisfies a threshold condition.
650
```

↓

```
Mark the empty group of memory cells for erasure.    660
```

Receive an input/output (IO) write request directed at a memory sub-system comprising a memory device, wherein the memory device comprises a plurality of zones, and wherein the I/O write request comprises at least a part of a file.   710

Append the at least part of the file to a compound file, wherein the compound file comprises one or more sequentially written files.
720

Allocate the compound file to one or more of the plurality of zones.
730

Cause the compound file to be written to the one or more of the plurality of zones.   740

FIG. 7

EFFECTIVE STORAGE ALLOCATION FOR SEQUENTIALLY-WRITTEN MEMORY DEVICES

TECHNICAL FIELD

Embodiments of the disclosure relate generally to memory sub-systems, and more specifically, relate to effective storage allocation for sequentially-written memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a block diagram that illustrates an example of a zone mapping data structure, according to some embodiments.

FIG. 6 is a flow diagram of an example method to implement a zone reset, in accordance with some embodiments of the present disclosure.

FIG. 7 is a flow diagram of an example method to efficiently allocate sequentially written files to zones of a memory device, in accordance with some embodiments of the present disclosure.

DETAILED DESCRIPTION

Figure 1A:
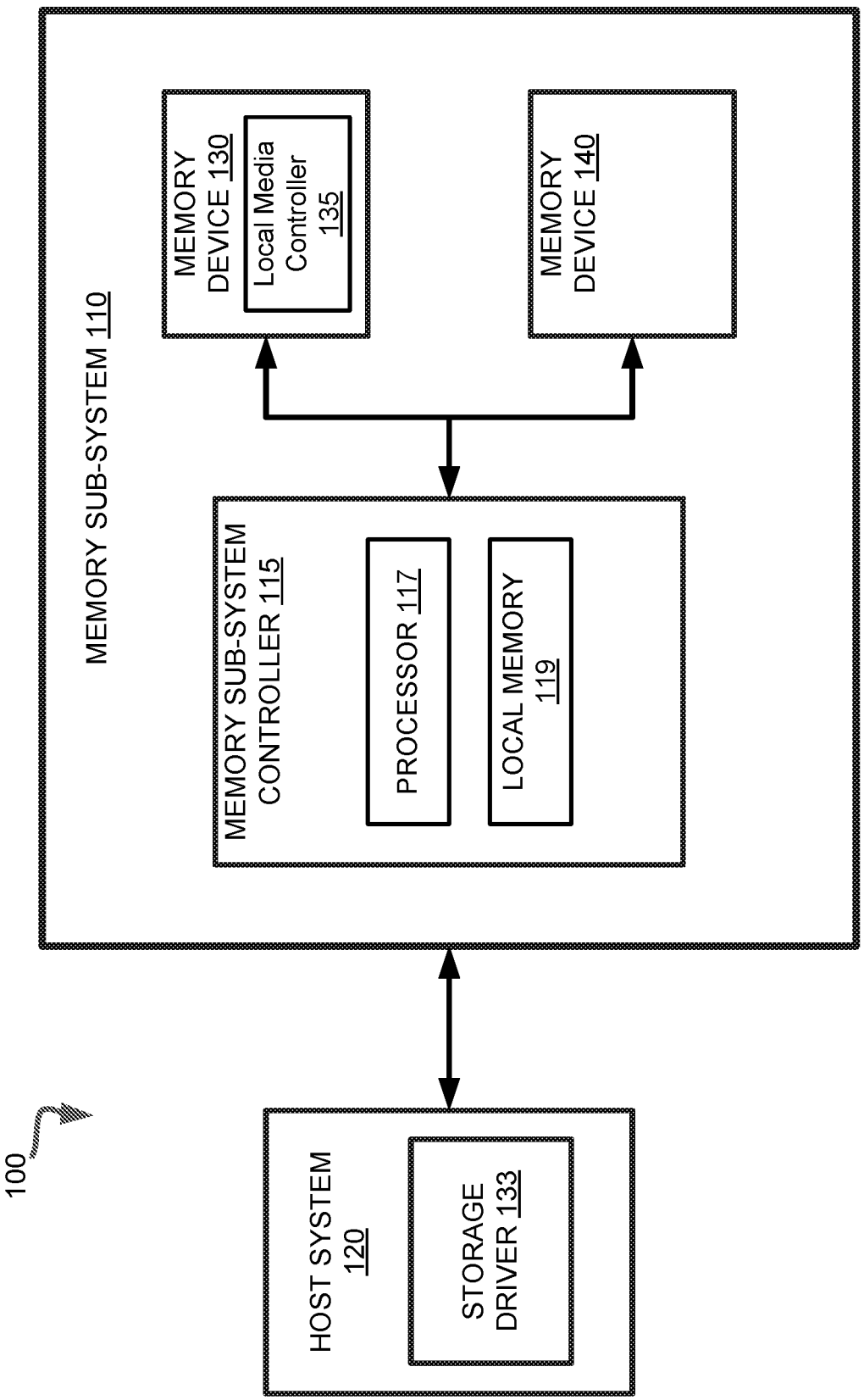
FIG. 1A illustrates an example computing system that includes a memory sub-system in accordance with some embodiments of the present disclosure.

Aspects of the present disclosure are directed to effective storage allocation for sequentially-written memory devices. A memory sub-system can be a storage device, a memory module, or a combination of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of a non-volatile memory device is a negative-and (NAND) memory device. Other examples of non-volatile memory devices are described in conjunction with FIG. 1A. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that store information. Depending on the cell type, a cell can store one or more bits of binary information, and has various logic states that correlate to the number of bits being stored. The logic states can be represented by binary values, such as "0" and "1," or combinations of such values.

The memory sub-system can include multiple components, such as memory devices that can store data from the host system in storage media, e.g., integrated circuit (IC) dies having addressable memory cells that individually store the data. Processing in certain memory sub-systems today is generally performed with random allocations to the IC dies and in small increments of data, e.g., four kilobytes (KB). These random allocations of a page or a block of data include non-sequential and/or random writes to the IC dies. This practice results in high costs in memory, e.g., dynamic random access memory (DRAM), static random access memory (SRAM), or persistent memory, for storing mapping data structures that track logical-to-physical (L2P) address mapping between logical block address (LBA) space and physical address space of the IC dies. For example, mapping overhead is about a gigabyte (GB) per terabyte (TB) of host addressable media, and thus, a 16 TB solid-state drive (SSD) requires a significant 16 GB of memory mapping overhead. Additionally, periodic snapshotting and logging is done to persist the mapping data structures across shutdowns and surprise power failure situations. This adds additional write overhead to the IC dies and performance loss.

Storage stacks, which can map physical block devices onto higher level virtual block devices, can take advantage of sequential input/output (I/O) memory device efficiencies. Storage stacks can be used to guide I/O from a user-space application to the physical memory device. For example, storage stacks included in file systems group data by locality (e.g., according to thread, process, life span, or application) and write the data sequentially to storage devices. File systems can then write data of different localities as parallel sequential streams to storage devices, each stream having its own locality. Reference to locality can reference either temporal locality or spatial locality. Data having temporal locality is data that a processor tends to access at the same memory locations repetitively over a short period of time, e.g., data written, over-written, and trimmed around the same time. Data having spatial locality captures the tendency that when a memory device references a particular storage location at a particular time, then the memory device is likely to reference nearby memory locations in the near future. In this case, a processor can attempt to determine the size and shape of the area around the current reference for which it is worthwhile to prepare for faster access for subsequent reference. Reference to sequential locality is a special case of spatial locality that occurs when data elements are arranged and accessed linearly, such as in traversing the elements in a one-dimensional array.

When data having locality are written sequentially, the data are written to groups of memory cells that are also referred to as zones for simplicity, where each zone can store multiple physical blocks of data. Thus, mapping can be recorded at a higher granularity (megabytes instead of kilobytes) in order to map a particular data group as a zone in the LBA space, which significantly reduces metadata that is logged. The mapping space associated with the LBA space at this granularity can be referred to as zoned namespace (ZNS), and a memory device written in this manner referred to as a ZNS memory device. In one example, a data group is made up of multiple blocks of data having locality, where each data block corresponds to a physical block (e.g., erase unit) of the IC dies. In one embodiment, the physical block (or erase unit) of a memory device is around 16 megabytes (MB) in size. The groups of memory cells (or zones) can be at least two to four times (or more) the size of the physical block. Accordingly, the zones can store at least 64 MB of data (e.g., 64 MB, 128 MB, 256 MB, 512 MB, or more), each of which is significantly larger than four kilobytes (KB).

In certain host operating systems, a file system handles management of files from the operating system, from applications running on the operating system, and metadata generated by the file system for purposes of organization of files and allocation of space in the IC dies necessary to write the files and metadata as they are generated. File systems of certain host operating systems such as Linux, Unix, and the like, allocate block groups (e.g., a contiguous portion of a file such as a series of LBAs) to a series of physical addresses of the IC dies at which to store the block group. The files can be, e.g., data files, metadata including index node (inodes), directory structure, free space manager, and the like, and other data structures (or objects) capable of packaging data/metadata and being written to the IC. These file systems typically allocate certain types of block groups to a particular series of physical addresses of the memory devices based on whether the block groups contain data or metadata, and try not to intermix the data and metadata within these particular series of physical addresses. In some host operating systems, a device mapper operating at the kernel level handles management of data objects from the operating system for purposes of organization of data objects and allocation of space in the memory devices. For example, the host system can include a software framework designed to receive (or intercept) write requests directed to the memory devices. A write request can include a payload, which includes the data to be written. The payload can be a have certain characteristics, such as whether the data to be written represents metadata or data in a file system, or a key or value in a key-value store, for example.

In certain host operating systems, the file system driver and/or the storage driver can be configured to allocate groups of memory cells (or zones) to particular sets of data. For example, a host operating system (e.g., the file system of the host operating system) can allocate one or more groups of memory cells (or zones) to each stream. A stream can contain a set of data (e.g., a file, a group of files, a data object, a group of data objects, or another similar construct) that shares one or more characteristics (e.g., the time of creation or deletion, the frequency of access, etc.).

Each group of memory cells can have a particular size. In some host systems, each set of data is allocated to one or more groups of memory cells, such that no group of memory cells would be shared between two or more sets of data (streams). However, the size of the set of data may not match the size of the group of memory cells. When this happens, a set of data does not completely fill up the group of memory cells, resulting in empty and unusable memory cells. For example, a set of data is one quarter the size of a group of memory cells will be stored in one group of memory cells, leaving the other three quarter of the group of memory cells empty. As another example, a set of data that is 3.5 times the size of a group of memory cells will be stored in 4 groups of memory cells, leaving one half of a group of memory cells empty. This empty space can result in inefficient utilization of the memory device.

Aspects of the present disclosure address the above-noted and other deficiencies by enhancing the host system (e.g., the file system of the host operating system, and/or a device mapper associated with the host system) with the ability to allocate one or more sets of data to each group of memory cells (e.g., to each zone in a ZNS). In some embodiments, aspects of the present disclosure can be implemented by the memory sub-system controller. Rather than allocating each set of data to one or more groups of memory cells, the host system operating in accordance with aspects of the present disclosure can append one or more sets of data to a compound data object, such as a temporary file residing on a volatile memory. The compound data object includes two or more sequentially written sets of data (data objects). The host system associates the compound data object with one or more groups of memory cells of the memory devices, and causes the compound data object to be written to the one or more groups of memory cells. As a result, each group of memory cells (e.g., each zone in a ZNS) can be shared among one or more sets of data, and each group of memory cells can be fully utilized.

Advantages of the present disclosure include, but are not limited to, improving utilization efficiency of zones with a ZNS. Some storage allocation systems for sequentially-written memory devices (e.g., using ZNS), in which zones were not shared among sets of data, can produce partially-filled zones, which equate to wasted storage capacity. Conversely, aspects of the present disclosure enable filling zones completely by enabling zones to be shared among multiple sets of data, thus avoiding wasted storage capacity. Furthermore, aspects of the present disclosure result in reduced write amplification. A zone reset involves erasing the entire zone. During a zone reset in some systems, in which zones are partially-filled, erasing the entire zone would result in unnecessarily erasing empty blocks, thus leading to increased write amplification, which negatively affected the wear of the memory device. Thus, advantages of the present disclosure include reduced write amplification, which results in memory devices that last longer. Other advantages will be apparent to those skilled in the art of memory allocation and mapping to memory devices discussed hereinafter.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD).

Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The computing system 100 includes a storage driver 133 in the host system 120 that is configured with storage allocation and device mapping functionality discussed herein throughout the figures. In some embodiments, the storage allocation and device mapping functionality can be implemented by a user space driver. In some embodiments, the host system 120 includes at least a portion of the storage allocation and device mapping functionality. In other embodiments, the memory sub-system controller 115 includes at least a portion of the storage allocation and device mapping functionality. For example, the memory sub-system controller 115 and the processing device (processor) of the host system 120 can be configured to execute instructions stored in memory for performing operations of the mapping and storage allocation functionality described herein.

Figure 1B:
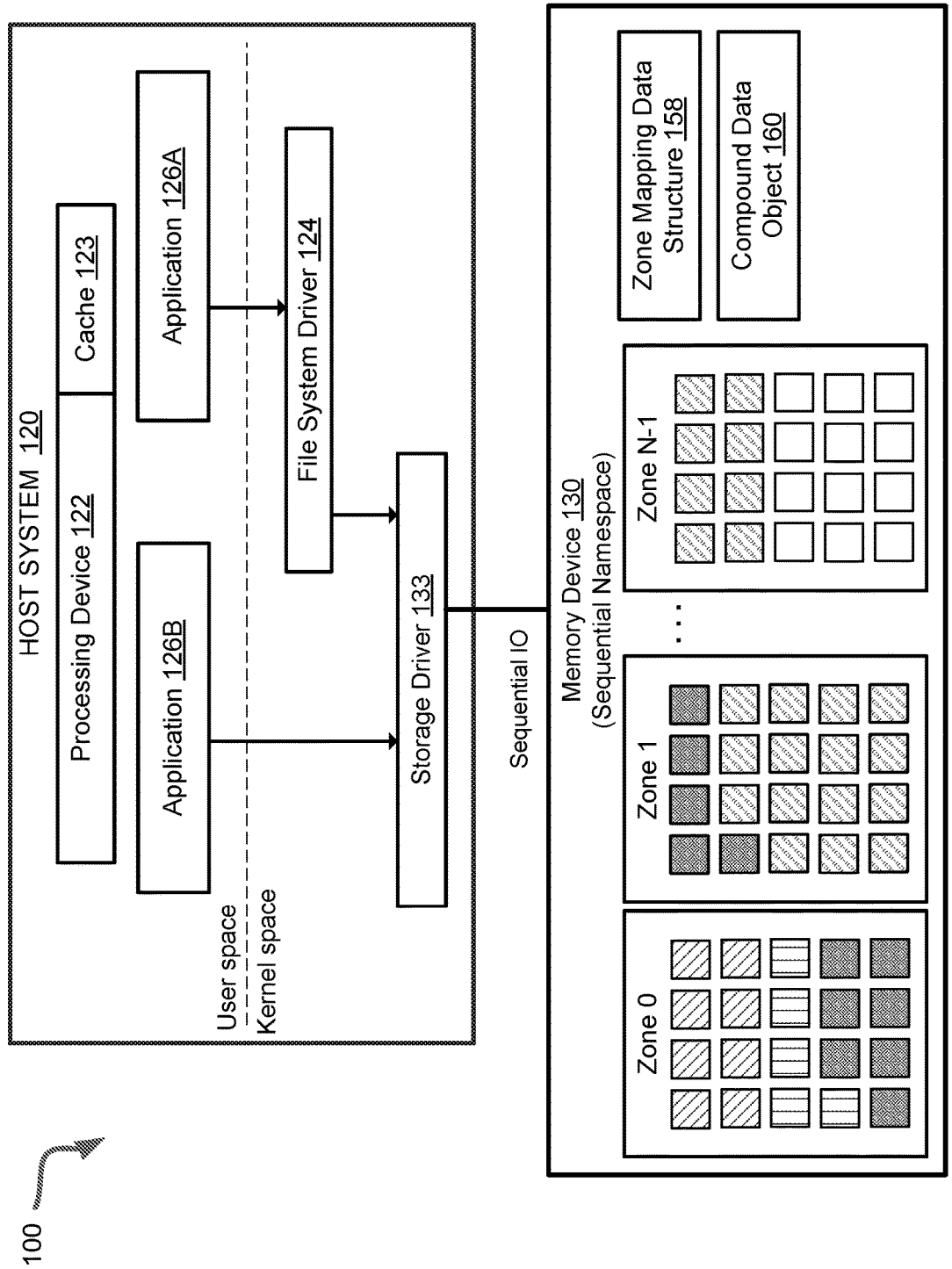
FIG. 1B is a detailed block diagram of the computing system of FIG. 1A according to some embodiments.

FIG. 1B is a detailed block diagram of the computing system 100 of FIG. 1A according to some embodiments. In various embodiments, the host system 120 includes a processing device 122, a cache 123, a file system driver 124, one or more applications 126A-126B, and a storage driver 133. In embodiments, the processing device 122 can perform instructions to execute the storage driver 133 and/or the file system driver 124, e.g., by executing a kernel of the operating system of the host system 120. The host system 120 can execute one or more applications 126A-126B. In an illustrative example, the application 126A may communicate with the file system driver 124. The file system driver 124 may run in the kernel space of the host system 120, and may be employed to process I/O requests (e.g., as read, write, and erase operations) initiated by one or more applications 126, including application 126A, running the user space of the host system 120. In embodiments, the file system driver 124 can translate the read, write, erase, and other requests issued by the application 126A to the storage driver 133. The storage driver 133 can communicate to the memory sub-system controller 115. The storage driver 133 can run in the kernel space of the host system 120 and can process requests received from the file system driver 124 and/or received from the application 126B. The storage driver 133 can process the requests into commands to be processed by the memory sub-system controller 115. In some embodiments, the storage allocation and device mapping functionalities described through can be implemented by a user-space driver. That is, functionalities described with respect to the storage driver 133 can be implemented by a user-space driver (not illustrated).

In various embodiments, the computing system 100 includes a memory device 130 associated with sequential namespace (e.g., ZNS). In one embodiment, the memory device 130 is a Zoned Namespace (ZNS) solid state device that implements the Zoned Namespace Command Set as defined by the NVM Express™ (NVMe™) organization. The zones in a ZNS can be groups of blocks that are sequentially numbered LBAs that are mapped to sequentially ordered physical addresses within the physical address space. The memory device 130 can be the storage device previously referred to that includes multiple IC dies. Writing sequentially to the zones (e.g., Zone 0, Zone 1, . . . Zone N−1), which are also referred to as groups of memory cells, is generally performed sequentially from the top (or smallest addresses) of the IC dies to the bottom (or largest addresses) of the IC dies, which is illustrated by the patterned blocks of data already written to the illustrated zones. The memory device 130 can also include the compound data object 160, as well as a zone mapping data structure 158. An example zone mapping data structure is described in conjunction with FIG. 2. In embodiments, the zone mapping data structure 158 and/or the compound data object 160 can be stored in a volatile memory device. In embodiments, the zone mapping data structure 158 can be a data structure to provide memory device layout information for each zone in a namespace. In embodiments, the zone mapping data structure 158 can comprise a logical-to-physical (L2P) mapping data structure to map the logical block numbers (or addresses) of LBA space to memory chunks that are allocated to zones or groups of memory. In these embodiments, the storage driver 133 can track logical block numbers (or addresses) of LBA space to the ZNS of the memory device 130 by sequential relationship, e.g., by being programmed to have access to the sequential physical addresses of the zones (or groups of memory cells) within the multiple IC dies of memory device 130. A write pointer (WP) to the zones of the memory device 130 can be stored in the cache 123.

Figure 3:
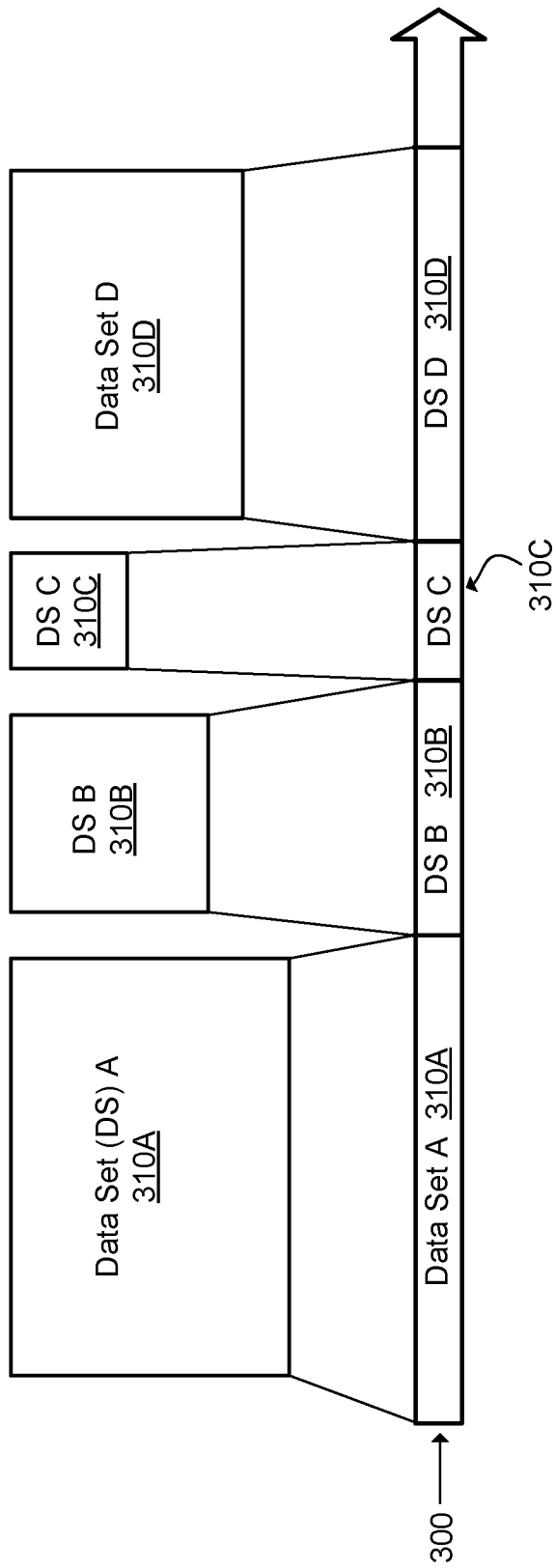
FIG. 3 is a schematic diagram that illustrates data objects appended to a compound data object, according to some embodiments.

In embodiments, the storage driver 133 of the host system 120 can receive write requests from applications 126A and/or from the file system driver 124. The write request can be directed at the plurality of IC dies of memory device 130. The write request can include at least a part of a stream to be stored at the memory device 130. A stream can contain a set of data (e.g., a file, a group of files, a data object, a group of data objects, or other similar construct(s)) that shares one or more characteristics (e.g., the time of creation or deletion, the frequency of access, etc.). Storage driver 133 can identify the set of data from the write request, and append the set of data to a compound data object 160. The compound data object 160 includes sequentially written data objects. The compound data object 160 can be stored as a temporary file residing on a volatile memory device of the memory subsystem. Additionally or alternatively, the compound data object 160 can be stored in non-volatile memory device 130. An example of data sets appended to compound data object 160 is illustrated in FIG. 3 below. Storage driver 133 can cause the compound data object to be associated with and written to groups of memory cells of memory device 130 by updating the zone mapping data structure 158. For example, storage driver 133 can associate each data set in the compound data object 160 with one or more zones. The storage driver 133 can update the zone mapping data structure 158 to include which data set(s) are assigned to each zone, and to increment the data set counter. The zone mapping data structure 158 is further described in conjunction with FIG. 2.

In embodiments, storage driver 133 can maintain a data set counter for each group of memory cells (the groups of memory cells are illustrated as zones in FIG. 1B). In embodiments, the counters can be stored in the cache 123, and/or in the zone mapping data structure 158. Each data set counter represents the number of streams (or sets of data) allocated to the zone. As the storage driver 133 associates the compound data object 160 with the zones in memory device 130, storage driver 133 can increment the counter associated with each zone based on the number of sets of data associated with each respective zone. For example, Zone 0 can be shared among three sets of data, and hence the storage driver 133 can increment (e.g., by one) the counter associated with Zone 0 three times. As another example, Zone 1 can be shared among two sets of data, and hence the storage driver 133 can increment the counter associated with Zone 1 twice.

In embodiments, storage driver 133 of the host system 120 can receive erase or delete requests directed at the plurality of IC dies of memory device 130. An erase request can specify which stream (or set of data) is to be deleted. Using the zone mapping data structure 158, the storage driver 133 can identify the group(s) of memory cells (e.g., zone(s)) at which the set of data is stored. In embodiments, the erase request can include the LBA at which the set of data to be erased is located. The storage driver 133 can use the zone mapping data structure 158 to translate the LBA to a physical address of the blocks of the memory device 130 at which the set of data to be erased is store. The storage driver 133 can mark for erasure the blocks storing the set of data to be erased. Furthermore, the storage driver 133 can decrement the counter associated with the group(s) of memory cells storing the set of data marked for erasure. For example, if the storage driver 133 receives an erase request for a set of data associated with Zone 0, the storage driver 133 can mark for erasure the block(s) at which the set of data is stored and can decrement (e.g., by 1) the counter associated with Zone 0. As another example, if the storage driver 133 receives an erase request for a set of data that is associated with both Zone 0 and Zone 1, the storage driver 133 can mark the block(s) at which the set of data is stored for erasure and can decrement the counters associated with Zone 0 and Zone 1. In embodiments, marking a set of data for erasure can include updating the L2P mapping data structure to indicate that the block(s) at which the set of data are stored contain invalid data.

To implement zone resets, the storage driver 133 can identify empty zones using the data set counters. In embodiments, zone mapping data structure 158 can maintain a pool of free zones which storage driver 133 can use to allocate newly written sets of data. Once a zone is empty (e.g., the set(s) of data stored in a zone have been marked for erasure), the zone can be reset and returned to the pool of free zones. The storage driver 133 can identify zones eligible for a zone reset by identifying zones that have a counter that satisfies a threshold condition. In embodiments, the threshold condition can be a threshold value, e.g. a value of zero. Hence, the storage driver 133 can identify zones that have a counter value of zero as eligible for a zone rest. The storage driver 133 can execute a zone reset for the zones that have a data set counter value satisfying the threshold condition, which can involve marking the plurality of memory devices associated with the zone for erasure and returning the zone to the free pool. In embodiments, memory cells associated with a zone are not erased until immediately before they are rewritten to avoid threshold voltage shift.

FIG. 2 is a block diagram that illustrates an example of a zone mapping data structure 158, according to various embodiments. The controller 115 can store the zone mapping data structure 158 in non-volatile memory device 130 of FIG. 1B. Alternatively or additionally, the controller 115 can store the zone mapping data structure 158 in a volatile memory device (e.g., memory device 140 of FIG. 1A). Alternatively or additionally, host system 120 can store at least a part of zone mapping data structure 158 in local memory. The controller 115 can configure or implement the media layout (e.g., a layout of where a data group of a zone is to be located within physical address space) using the zone mapping data structure 158, alone or in combination with other data structures not pictured.

In FIG. 2, the zone mapping data structure 158 is configured to provide memory device layout information for a zone in a namespace, e.g., the LBA space for ZNS operations. The zone mapping data structure 158 can have multiple entries. Each zone mapping entry in the zone mapping data structure 158 identifies information about a zone, such as a starting LBA 260 of the zone, a block set identifier 262 of the zone, a zone cursor value 264, a state 266 of the zone, data set identifier 268, a counter 270 of the zone, and the like.

The host system 120 can associate the compound data object 160 with one or more zones beginning at the starting LBA 260 of the first free zone. The host system 120 can write compound data object 160 in the zones sequentially in the LBA space. After an amount of data has been written into the zone, the current starting LBA address for writing subsequent data is identified by the zone cursor value 264. The state 266 can have a value indicating that the zone is empty, full, implicitly open, explicitly open, closed, and the like, to track progress of writing that zone.

The compound data object 160 includes one or more sets of data. In embodiments, the zone mapping data structure 158 can include a data set identifier 268. The data set identifier 268 can store a reference to the data set(s) stored in the zone. For example, the data set identifier 268 can include a specific data set ID for each data set stored in that zone. Furthermore, for each set of data stored in the zone, the counter 270 can be incremented by a predetermined value (e.g., by one). For each set of data marked for erasure in the zone, the counter 270 can be decremented by the predetermined value (e.g., by one). Hence, the counter 270 represents the number of sets of data associated with each zone. This way, the counter 270 can be used to identify empty zones. For example, for a counter 270 that starts at a value of zero, the host system 120 and/or the controller 115 can determine that a zone with a counter 270 value of zero is empty. An empty zone is one in which all data stored in the zone has been marked for erasure. The controller 115 can assign empty zones to the pool of free zones.

FIG. 3 illustrates data objects appended to a compound data object 300, implemented in accordance with some embodiments of the present disclosure. In some embodiments, compound data object 300 can be the same as compound data object 160 of FIG. 1B. This example illustrates appending data sets to a compound data object. However, as described throughout the disclosure, embodiments of the present disclosure can be applied to data objects, groups of data objects, files, groups of files, or other similar construct(s). In embodiments, the compound data object 300 can be stored in the zone mapping data structure 158 of FIG. 1B, or can be stored locally on the host system 120 of FIG. 1B.

In embodiments, processing logic of the host system (e.g., device mapping logic of a kernel) receives write requests directed to a plurality of memory devices. In the example illustrated in FIG. 3, the write requests include Data Sets (DS) A-D 310A-310D. For example, the first write request includes Data Set A 310A, the second write request includes DS B 310B, the third write request includes DS C 310C, and the fourth write request includes DS D 310D. In conventional host operating systems, the processing logic of the host system would associate each data set to an integer number of groups of memory cells (e.g., zones). For example, if Data Set A 310A was 3.5 times the size of a zone, conventional host operating systems would allocate 4 zones to Data Set A 310A, leaving a half of a zone empty. As another example, if DS C 310C was one tenth the size of a zone, conventional host operating systems would allocate 1 zone to DS C 310C, leaving nine tenths of the zone empty.

As illustrated in FIG. 3, Data Sets A-D 310A-310D are sequentially appended to a compound data object 300. In embodiments, the kernel can store, to a logical-to-physical (L2P) mapping data structure, entries that map the data sets to the compound data object 300. Furthermore, the kernel can store additional entries that map the compound data object to specific groups of memory cells, as illustrated in FIG. 4 below.

Figure 4:
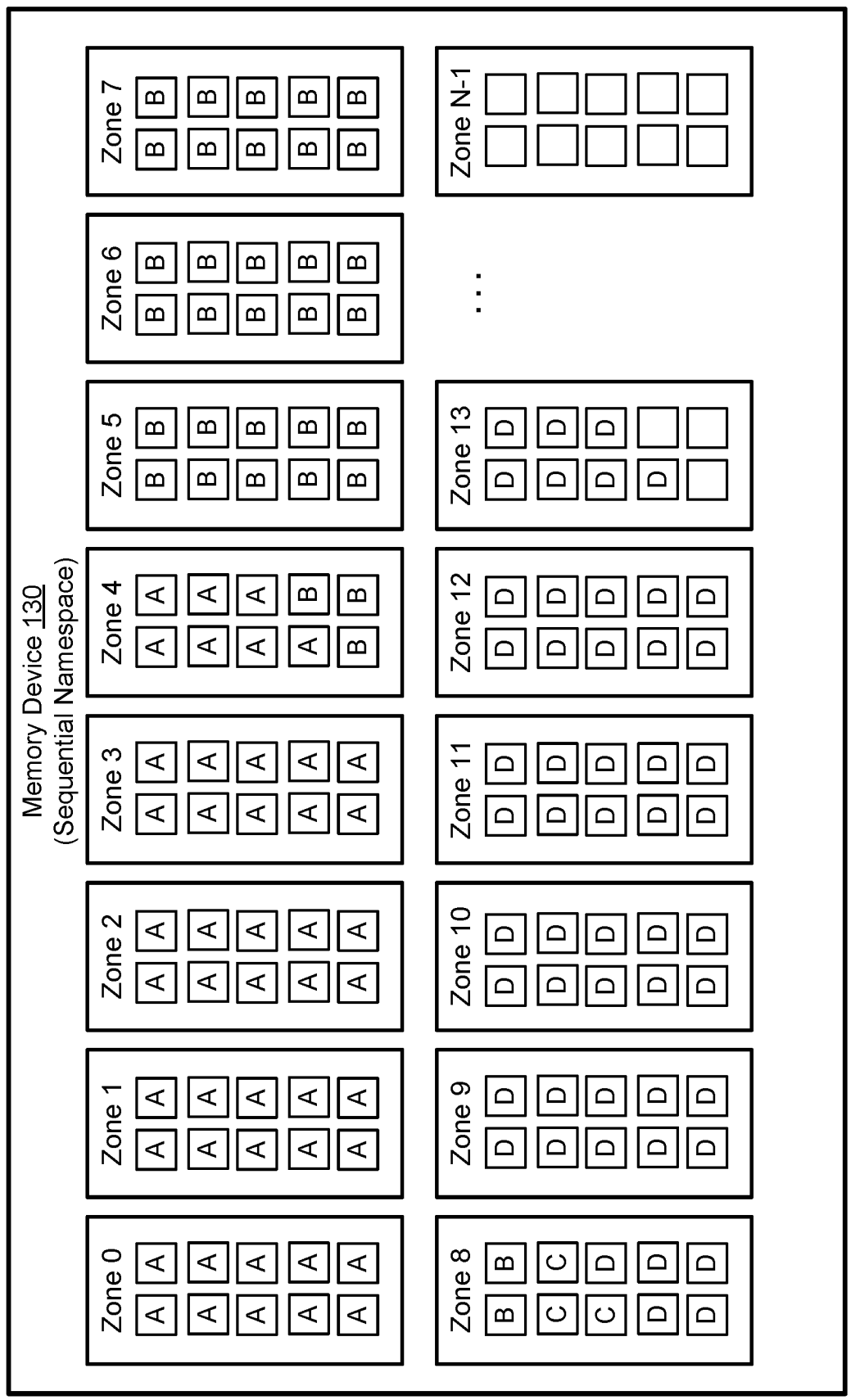
FIG. 4 is a schematic diagram that illustrates data objects allocated to groups of memory cells, according to some embodiments.

FIG. 4 illustrates the data sets from FIG. 3 allocated to the groups of memory cells (illustrated as zones) in memory device 130. As illustrated in FIG. 4, Data Set A 310A fills Zone 0, Zone 1, Zone 2, and Zone 3 completely, and fills a part of Zone 4. Zone 4 is shared between Data Set A 310A and Data Set B 310B. Data Set B 310B further fills Zones 5 through 7 completely, and part of Zone 8. Data Set C 310C is allocated to a part of Zone 8. The rest of Zone 8 is allocated to Data Set D 310D. Data Set D 310D further fills Zones 9 through 12, and part of Zone 13. As illustrated FIG. 4, each zone can be allocated to more than one data set.

In response to allocating a zone (or part of a zone) to a data set, the storage driver increments a counter (e.g., by 1) associated with the zone. For example, each data set counter can begin at 0, and can be incremented by 1 each time a data set is written to the zone. Hence, in the example in FIG. 4, the counter associated with Zone 0 would be 1 because only Data Set A 310A is associated with Zone 0. The counter associated with Zone 4 would be incremented twice because Zone 4 is associated with Data Set A 310A and Data Set B 310B. The counter associated with Zone 8 would be incremented three times because Zone 8 is associated with Data Set B 310B, Data Set C 310C, and Data Set D 310D.

According to this illustrative example, the DS Identifier 268 in the zone mapping data structure 158 entry for zone 0 references Data Set A, and the counter 270 in the zone mapping data structure 158 entry for zone 0 is incremented by the predetermined value (e.g., by 1). The DS Identifier 268 in the zone mapping data structure 158 entry for zone 4 references both Data Sets A and B, and the counter 270 in the zone mapping data structure 158 entry for zone 4 is incremented twice by the predetermined value. The DS Identifier 268 in the zone mapping data structure 158 entry for zone 8 references Data Sets A, B, and C, and the counter 270 in the zone mapping data structure 158 entry for zone 8 is incremented three times by the predetermined value. Finally, the DS Identifier 268 in the zone mapping data structure 158 entry for zone 13 reference both Data Sets D, the counter 270 in the zone mapping data structure 158 entry for zone 13 is incremented by the predetermined value, and the State 266 in the zone mapping data structure 158 entry for zone 13 can indicate that the zone is not full, and the next compound data object written by the host system is to begin with that zone.

In embodiments, the kernel receives a delete or erase request. The storage driver identifies which data set is included in the delete request and marks that data set for erasure. Specifically, the storage driver can identify the zones to which the data set in the delete request is allocated, and can mark the blocks associated with the data set for erasure. The storage driver also decrements the counter associated with the zone(s) with which the data set is associated. As an illustrative example, if the kernel receives a delete request for Data Set C 310C, the storage driver can identify the blocks in Zone 8 in which Data Set C 310C is allocated and mark those block for erasure. Furthermore, the storage driver can decrement the counter (e.g., by one) associated with Zone 8. The storage driver can use the counters associated with each zone to identify empty zones. If the data set counter associated with a specific zone satisfies a threshold, the storage driver can determine that the specific zone is empty and can execute a zone reset, as is further described with regard to FIG. 6 below.

Figure 5:
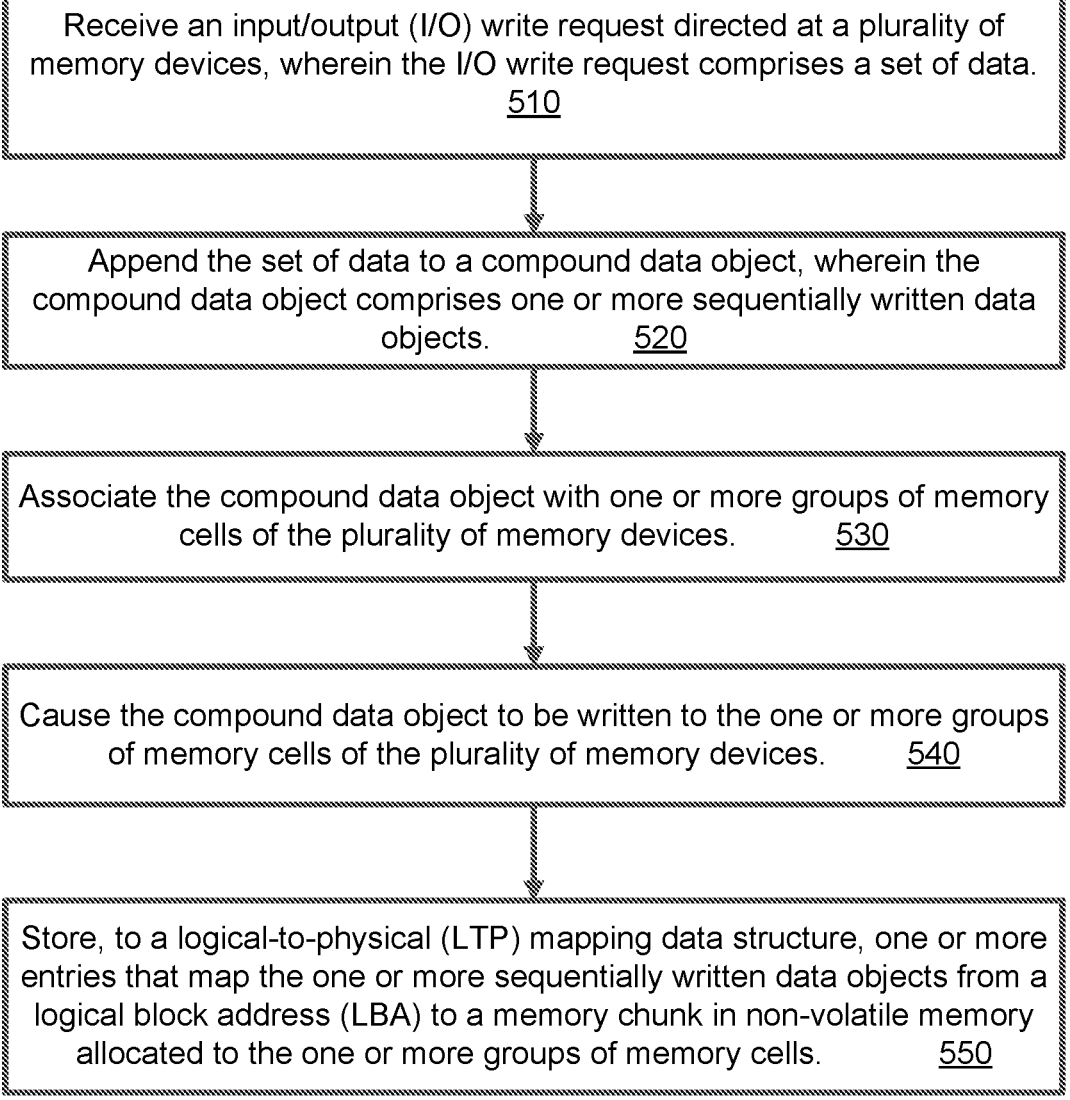
FIG. 5 is a flow diagram of an example method to efficiently allocate data objects to groups of memory cells of a memory device, in accordance with some embodiments of the present disclosure.

FIG. 5 is a flow diagram of an example method 500 to efficiently allocate data objects from write requests to groups of memory cells of a memory device, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the host system 120 (e.g., via execution of the storage driver 133 by the processing device 122) of FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic receives an input/output (I/O) write request directed at multiple memory devices, e.g., of the memory device 130 of FIG. 1A. The write request can be a request to write a data set to memory device 130. The data set can include one or more data objects that share one or more characteristics (e.g., the time of creation or deletion, the frequency of access, etc.). In embodiments, the write request is received from a file system being executed on the host system.

At operation 520, the processing logic appends the data set to a compound data object. The compound data object can be a data object that includes one or more sequentially written data objects. Hence, at operation 520, the processing logic sequentially adds the one or more data objects included in the data set to the end of the compound data object. In embodiments, the processing logic stores, to a zone mapping data structure, entries that map the data set to the compound data object.

At operation 530, the processing logic associates the compound data object with one or more groups of memory cells of the plurality of memory devices. In embodiments, the processing logic can allocate the one or more sequentially written data objects from the compound data object to the one or more groups of memory cells of the plurality of memory devices. The groups of memory cells can be sequentially numbers LBAs that are mapped to sequentially ordered physical addresses within the physical address space of a die. The processing logic can increment a data set counter associated with each of the one or more groups of memory cells of the plurality of memory devices. The data set counter represents the number of data sets allocated to each group of memory cells, and hence the processing logic increments each data set counter by the number of data sets allocated to the respective group of memory cells.

At operation 540, the processing logic causes the compound data object to be written to the one or more groups of memory cells of the plurality of memory devices. For example, the processing logic sends a write command to the memory device. The write command can include the compound data object, and can be directed to the one or more groups of memory cells. In embodiments, a storage driver can access physical addresses of groups of memory cells of the multiple memory devices. Furthermore, the storage driver targets sequential write operations to the physical addresses.

At operation 550, the processing logic stores, to a logical-to-physical (L2P) mapping data structure, one or more entries that map the one or more data objects from a logical block address (LBA) to a memory chunk in non-volatile memory allocated to the one or more groups of memory cells.

FIG. 6 is a flow diagram of an example method 600 to implement a zone reset, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the host system 120 (e.g., via execution of the storage driver 133 by the processing device 122) of FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic receives an input/output (I/O) erase request directed at a plurality of memory devices. The I/O erase request includes the data set to be erased.

At operation 620, the processing logic identifies a group of memory cells of the plurality of memory devices associated with the data set. A logical-to-physical (L2P) mapping data structure includes entries that map the data sets from a logical block address (LBA) to a memory chunk in non-volatile memory allocated to the one or more groups of memory cells. The processing logic can use the L2P mapping data structure to identify the group(s) of memory cells with which the data set from the erase request is associated.

At operation 630, the processing logic marks the data set for erasure. The processing logic can use the L2P mapping data structure to identify the physical blocks storing the data set, and mark the physical blocks for erasure. In implementations, marking the physical blocks for erasure can include marking the blocks as invalid in the L2P mapping data structure.

At operation 640, the processing logic decrements a counter associated with the group of memory cells of the plurality of memory devices. The counter represents the number of data sets associated with teach group of memory cells.

At operation 650, the processing logic identifies an empty of group memory cells, wherein the data set counter associated with the empty group of memory cells satisfies a threshold condition. The threshold condition can be satisfying a threshold value, such as a value of zero. Hence, the processing logic identifies groups of memory cells that have a data set counter of zero as empty.

At operation 660, the processing logic marks the empty group of memory cells for erasure. The processing logic can implement a reset on the groups of memory cells that are marked for erasure, and return the group of memory cells to the free pool. Groups of memory cells allocated to the free pool can be erased and allocated to newly received write requests.

FIG. 7 is a flow diagram of an example method 700 to efficiently allocate sequentially written files to zones of a memory device, in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the host system 120 (e.g., via execution of the file system driver 124 and/or storage driver 133 by the processing device 122) of FIGS. 1A and 1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic receives an input/output (I/O) write request directed at a memory sub-system comprising a memory device, wherein the memory device comprises a plurality of zones, and wherein the I/O write request comprises at least a part of a file. In embodiments, the memory sub-system comprises a solid state drive (SSD) and the plurality of zones comprise Zoned Namespaces.

At operation 720, the processing logic appends the at least part of the file to a compound file, wherein the compound file comprises one or more sequentially written files. In embodiments, the compound file can be a temporary file residing on a volatile memory device.

At operation 730, the processing logic allocates the compound file to one or more of the plurality of zones. The processing logic stores, to a logical-to-physical (L2P) mapping data structure, entries that map the sequentially written files from a logical block address to a memory chunk in a non-volatile memory allocated to the zones.

At operation 740, the processing logic causes the compound file to be written sequentially to the one or more of the plurality of zones. The processing logic can increment a file counter associated with each of the one or more zones. Each file counter can represent the number of files associated with the respective zone.

In embodiments, the processing logic can receive an erase request directed at the memory sub-system. The erase request can specify a file to be erased. The processing logic can use the L2P mapping data structure to identify the zone(s) with which the file to be erased is allocated, and decrement a file counter associated with the identified zone (s). Using the file counter, the processing logic can identify empty zones that are eligible for a zone reset. A zone reset can include erasing the data store at the zone and allocating the zone to the free pool of zones. The processing logic can identify empty zones eligible for a zone reset by identifying zones that have a file counter that satisfies a threshold condition. In implementations, the threshold condition can be a threshold value, e.g. zero. Hence, the processing logic identifies zones that have a file counter equal to zero as zones that are eligible for a zone reset. The processing logic can mark the identified empty zones for erasure, for example by updating the LPT mapping data structure to mark the data store in the empty zones as invalid. The processing logic can further associate the identified empty zones to the free pool of zones.

Figure 8:
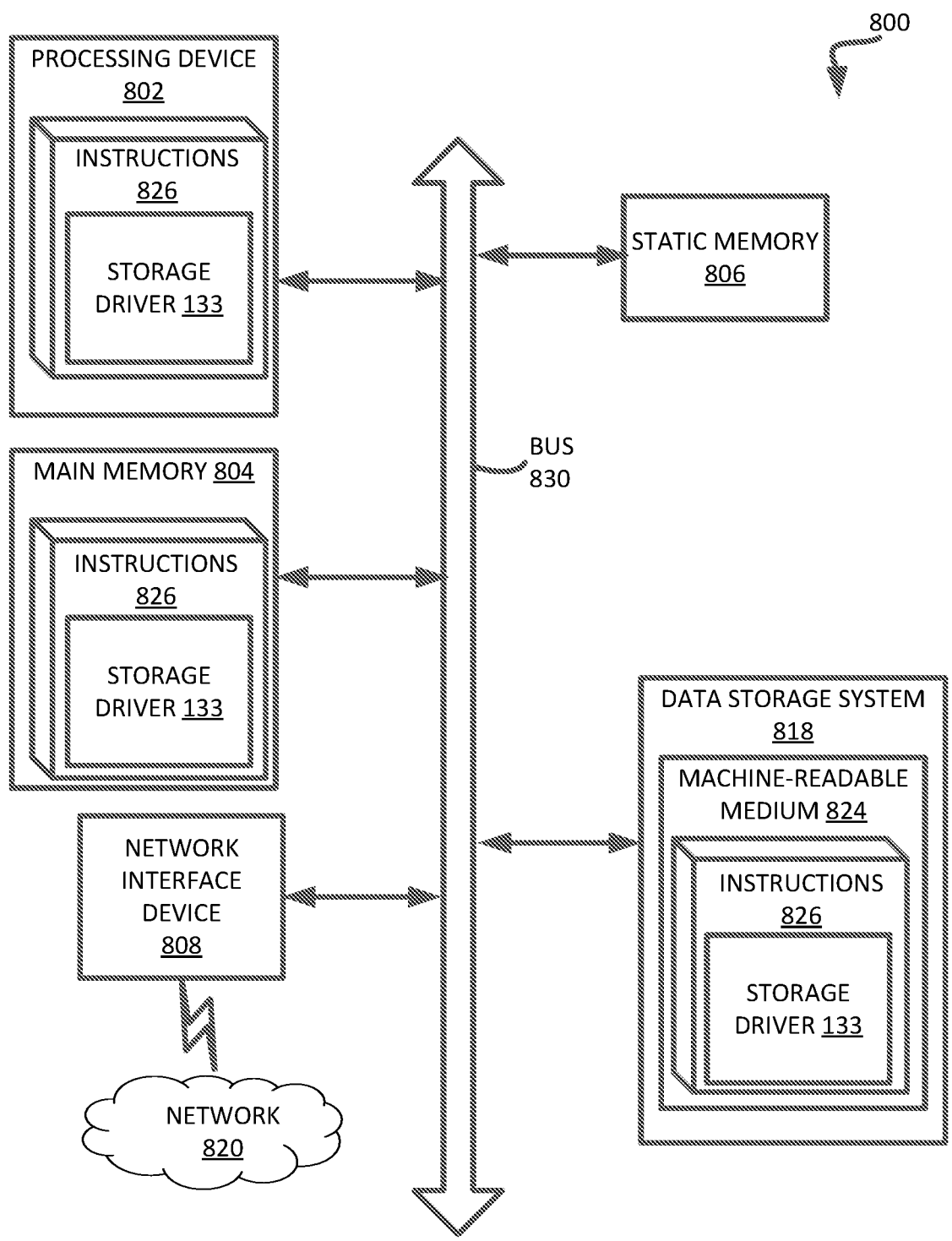
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIGS. 1A and 1B) that includes, is coupled to, or utilizes a memory sub-system (e.g., the memory sub-system 110 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1A.

In one embodiment, the instructions 826 include instructions to implement functionality corresponding to the storage driver 133 of FIGS. 1A and 1B. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a plurality of memory devices; and
    a processing device coupled to the plurality of memory devices, the processing device to perform operations comprising:
        receiving an input/output (I/O) write request directed at the plurality of memory devices, wherein the I/O write request comprises a first data object, wherein the plurality of memory devices comprises a plurality of groups of memory cells corresponding to sequential logical addresses, and wherein each group of memory cells of the plurality of groups of memory cells is associated with an available capacity state indicating at least one of: a full state or a not-full state;
        appending the first data object to a compound data object, wherein the compound data object comprises one or more sequentially written data objects;
        identifying, based on an order corresponding to the sequential logical addresses, a first group of memory cells of the plurality of groups of memory cells, wherein the first group of memory cells is in a not-full state;
        associating a first portion of the compound data object with the first group of memory cells;
        responsive to determining that the associating the first portion of the compound data object with the first group of memory cells results in the full state of the first group of memory cells, identifying one or more subsequent, in the order corresponding to the sequential logical addresses, groups of memory cells in the not-full state;
        associating a second portion of the compound data object with the one or more subsequent groups of memory cells; and
        causing the compound data object to be written to the first group of memory cells and the one or more subsequent groups of memory cells, resulting in the full state of the first group of memory cells and at least one of the one or more subsequent groups of memory cells.

2. The system of claim 1, wherein associating the compound data object with the first group of memory cells and the one or more subsequent groups of memory cells comprises:
    allocating the one or more sequentially written data objects to the first group of memory cells and the one or more subsequent groups of memory cells; and
    incrementing a data set counter associated with each of the first group of memory cells and the one or more subsequent groups of memory cells, wherein the data set counter represents a number of sets of data associated with each of the first group of memory cells and the one or more subsequent groups of memory cells.

3. The system of claim 1, wherein the operations being performed are executed by a storage driver of an operating system on which a host file system is being executed.

4. The system of claim 3, wherein the storage driver can access physical addresses of groups of cells of the plurality of memory devices, and wherein the storage driver is to target sequential write operations to the physical addresses.

5. The system of claim 1, the operations further comprising:
    receiving an input/output (I/O) erase request directed at the plurality of memory devices, wherein the I/O erase request comprises a second set of data;

identifying a second group of memory cells of the plurality of memory devices associated with the second set of data;

marking the second set of data for erasure; and decrementing a data set counter associated with the second group of memory cells of the plurality of memory devices, wherein the data set counter represents a number of sets of data associated with each of the second group of memory cells.

6. The system of claim 1, the operations further comprising:

identifying an empty group of memory cells, wherein a data set counter associated with the empty group of memory cells satisfies a threshold condition; and marking the empty group of memory cells for erasure.

7. The system of claim 1, the operations further comprising:

storing, to a logical-to-physical (L2P) mapping data structure, one or more entries that map the one or more sequentially written data objects from a logical block address (LBA) to a memory chunk in non-volatile memory allocated to the first group of memory cells and the one or more subsequent groups of memory cells.

8. A method comprising:

receiving, by a processing device executing a file system of an operation system, an input/output (I/O) write request directed at a memory sub-system comprising a memory device, wherein the memory device comprises a plurality of zones corresponding to sequential logical addresses, wherein each zone of the plurality of zones is associated with an available state indicating at least one of: a full state or a not-full state, and wherein the I/O write request comprises at least part of a file;

appending the at least part of the file to a compound file, wherein the compound file comprises one or more sequentially written files;

identifying, based on an order corresponding to the sequential logical addresses, a first zone of the plurality of zones, wherein the first zone is in a not-full state;

allocating a first portion of the compound file to the first zone;

responsive to determining that the allocating the first portion of the compound file to the first zone results in the full state of the first zone, identifying one or more subsequent, in the order corresponding to the sequential logical addresses, zones in the not-full state;

allocating a second portion of the compound file to the one or more subsequent zones; and causing the compound file to be written to the first zone and the one or more subsequent zones, resulting in the full state of the first zone and at least one of the one or more subsequent zones.

9. The method of claim 8, further comprising:

incrementing a file counter associated with each zone of the plurality of zones allocated to the one or more sequentially written files, wherein the file counter represents a number of files associated with each zone of the plurality of zones.

10. The method of claim 8, wherein the memory sub-system comprises a Solid State Drive (SSD) and the plurality of zones comprise Zoned Namespaces (ZNS).

11. The method of claim 8, further comprising:

receiving an input/output (IO) erase request directed at the memory sub-system, wherein the erase request comprises a second file;

identifying a second zone associated with the second file;

marking the second file for erasure; and decrementing a file counter associated with the second zone, wherein the file counter represents a number of files associated with the second zone.

12. The method of claim 8, further comprising:

identifying an empty zone, wherein a file counter associated with the empty zone satisfies a threshold condition; and marking the empty zone for erasure.

13. The method of claim 8, further comprising:

storing, to a logical-to-physical (L2P) mapping data structure, one or more entries that map the one or more sequentially written files from a logical block address (LBA) to a memory chunk in non-volatile memory allocated to the first zone and the one or more subsequent zones.

14. A non-transitory computer-readable storage medium comprising instructions that, when executed by a processing device, cause the processing device to perform operations comprising:

receiving an input/output (I/O) write request directed at a plurality of memory devices, wherein the I/O write request comprises a first data object, wherein the plurality of memory devices comprises a plurality of groups of memory cells corresponding to sequential logical addresses, and wherein each group of memory cells of the plurality of groups of memory cells is associated with an available capacity state indicating at least one of: a full state or a not-full state;

appending the first data object to a compound data object, wherein the compound data object comprises one or more sequentially written data objects;

identifying, based on an order corresponding to the sequential logical addresses, a first group of memory cells of the plurality of groups of memory cells, wherein the first group of memory cells is in a not-full state;

associating a first portion of the compound data object with the first group of memory cells;

responsive to determining that the associating the first portion of the compound data object with the first group of memory cells results in the full state of the first group of memory cells, identifying one or more subsequent, in the order corresponding to the sequential logical addresses, groups of memory cells in the not-full state;

associating a second portion of the compound data object with the one or more subsequent groups of memory cells; and causing the compound data object to be written to the first group of memory cells and the one or more subsequent groups of memory cells, resulting in the full state of the first group of memory cells and at least one of the one or more subsequent groups of memory cells.

15. The non-transitory computer-readable storage medium of claim 14, wherein associating the compound data object with the first group of memory cells and the one or more subsequent groups of memory cells comprises:

allocating the one or more sequentially written data objects to the first group of memory cells and the one or more subsequent groups of memory cells; and incrementing a data set counter associated with each of the first group of memory cells and the one or more subsequent groups of memory cells, wherein the data set counter represents a number of sets of data associated with each of the first group of memory cells and the one or more subsequent groups of memory cells.

16. The non-transitory computer-readable storage medium of claim 14, wherein the operations being performed are executed by a storage driver of an operating system on which a host file system is being executed.

17. The non-transitory computer-readable storage medium of claim 16, wherein the storage driver can access physical addresses of groups of cells of the plurality of memory devices, wherein the storage driver is to target sequential write operations to the physical addresses.

18. The non-transitory computer-readable storage medium of claim 14, wherein the processing device is to perform operations further comprising:
receiving an input/output (I/O) erase request directed at the plurality of memory devices, wherein the I/O erase request comprises a second set of data;
identifying a second group of memory cells of the plurality of memory devices associated with the second set of data;
marking the second set of data for erasure; and
decrementing a data set counter associated with the second group of memory cells of the plurality of memory devices, wherein the data set counter represents a number of sets of data associated with the second group of memory cells.

19. The non-transitory computer-readable storage medium of claim 14, wherein the processing device is to perform operations further comprising:
identifying an empty group of memory cells, wherein a data set counter associated with the empty group of memory cells satisfies a threshold condition; and
marking the empty group of memory cells for erasure.

20. The non-transitory computer-readable storage medium of claim 14, wherein the processing device is to perform operations further comprising:
storing, to a logical-to-physical (L2P) mapping data structure, one or more entries that map the one or more sequentially written data objects from a logical block address (LBA) to a memory chunk in non-volatile memory allocated to the first group of memory cells and the one or more subsequent groups of memory cells.

* * * * *